Dec. 11, 1962   I. W. LICHTENFELS ET AL   3,068,390
RESISTANCE SWITCHING NETWORK AND MOTOR CONTROL SYSTEM
Original Filed Nov. 16, 1954   2 Sheets-Sheet 1

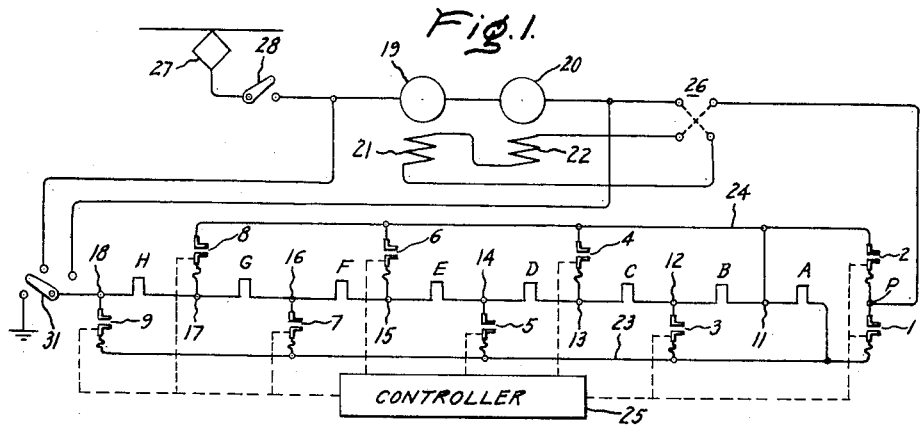

| NOTCH | OHMS | CHANGE | 1 | 2 | 3 | 4 | 5 | 6 | 7 | 8 | 9 | A | B | C | D | E | F | G | H |
|---|---|---|---|---|---|---|---|---|---|---|---|---|---|---|---|---|---|---|---|
| 1 | 8.82 |  | o |  |  |  |  |  |  |  |  | o | o | o | o | o | o | o | o |
| 2 | 6.77 | 2.05 | o | o |  |  |  |  |  |  |  |  | o | o | o | o | o | o | o |
| 3 | 5.75 | 1.02 |  | o | o |  |  |  |  |  |  | o | o | o | o | o | o | o | o |
| 4 | 4.72 | 1.03 | o | o | o |  |  |  |  |  |  |  | o | o | o | o | o | o | o |
| 5 | 4.11 | .61 | o |  | o | o |  |  |  |  |  | o | o | o | o | o | o | o | o |
| 6 | 3.57 | .54 | o | o | o | o |  |  |  |  |  |  | o | o | o | o | o | o | o |
| 7 | 3.15 | .42 |  | o |  | o | o |  |  |  |  | o |  | o | o | o | o | o | o |
| 8 | 2.79 | .36 |  | o | o | o | o |  |  |  |  | o | o | o | o | o | o | o | o |
| 9 | 2.42 | .37 | o | o | o | o | o |  |  |  |  |  |  | o | o | o | o | o | o |
| 10 | 2.20 | .22 | o |  |  | o | o |  |  |  |  | o | o | o | o | o | o | o | o |
| 11 | 2.09 | .13 | o |  | o |  | o | o |  |  |  | o | o |  | o | o | o | o | o |
| 12 | 1.98 | .11 | o |  | o | o | o | o |  |  |  | o | o | o |  | o | o | o | o |
| 13 | 1.74 | .24 | o | o | o | o | o | o |  |  |  |  |  |  | o | o | o | o | o |
| 14 | 1.57 | .17 |  | o |  |  | o | o |  |  |  | o |  |  | o | o | o | o | o |
| 15 | 1.42 | .15 |  | o | o |  | o | o |  |  |  | o | o | o | o | o | o | o | o |
| 16 | 1.36 | .06 |  | o | o | o | o | o |  |  |  | o | o | o |  | o | o | o | o |
| 17 | 1.23 | .13 |  | o | o | o | o | o | o |  |  | o | o | o | o | o | o | o | o |
| 18 | 1.06 | .17 |  | o | o | o | o | o | o |  |  |  |  |  |  | o | o | o | o |
| 19 | .98 | .08 | o |  |  |  |  | o | o |  |  | o | o | o | o | o | o | o | o |
| 20 | .87 | .11 | o |  | o |  |  | o | o |  |  | o | o |  |  |  | o | o | o |
| 21 | .76 | .11 | o |  | o | o |  | o | o |  |  | o | o | o | o | o |  | o | o |
| 22 | .73 | .03 | o |  | o | o | o | o | o |  |  | o | o | o | o |  |  | o | o |
| 23 | .64 | .09 | o |  | o | o | o | o | o |  |  | o | o | o | o | o | o |  | o |
| 24 | .51 | .13 | o | o | o | o | o | o | o |  |  |  |  |  |  |  |  |  | o |
| 25 | .38 | .13 |  | o |  |  |  | o | o | o |  |  |  |  |  |  |  |  | o |
| 26 | .31 | .07 |  | o | o |  |  | o | o | o |  | o | o | o | o | o | o | o | o |
| 27 | .26 | .05 |  | o | o | o |  | o | o | o |  | o | o | o | o | o |  | o | o |
| 28 | .193 | .067 |  | o | o | o | o | o | o | o |  | o | o | o | o | o | o | o | o |
| 29 | .163 | .030 |  | o | o | o | o | o | o | o | o | o | o | o | o | o | o | o | o |
| 30 | .106 | .057 |  | o | o | o | o | o | o | o | o | o | o | o | o | o | o | o | o |
| 31 | 0 | .106 | o | o | o | o | o | o | o | o | o |  |  |  |  |  |  |  |  |
|  |  |  |  |  |  |  |  |  |  |  |  |  |  |  |  |  |  |  |  |
| 11a | 1.98 | .22 | o |  | o | o | o | o |  |  |  |  | o | o | o | o | o | o | o |
| 12a | 1.74 | .24 | o | o | o | o | o | o |  |  |  |  |  |  |  |  | o | o | o |
| 13a | 1.57 | .17 |  | o |  |  | o | o |  |  |  | o |  |  |  | o | o | o | o |
| 14a | 1.42 | .15 |  | o | o |  | o | o |  |  |  | o | o | o | o | o | o | o | o |
| 15a | 1.23 | .19 |  | o | o | o | o | o | o |  |  | o | o | o | o | o | o | o | o |
| 16a | 1.06 | .17 |  | o | o | o | o | o | o |  |  |  |  |  |  |  | o | o | o |
| 17a | .87 | .19 | o |  | o |  |  | o | o |  |  | o | o |  |  |  |  | o | o |
| 18a | .74 | .13 | o |  | o | o |  | o | o |  |  | o | o | o | o | o |  | o | o |
| 19a | .64 | .10 | o |  | o | o | o | o | o |  |  | o | o | o | o | o | o |  | o |
| 20a | .51 | .13 | o | o | o | o | o | o | o |  |  |  |  |  |  |  |  |  | o |
| 21a | .38 | .13 |  | o |  |  |  | o | o | o |  |  |  |  |  |  |  |  | o |
| 22a | .26 | .12 |  | o | o |  |  | o | o | o |  |  |  |  |  |  |  |  | o |
| 23a | .19 | .07 |  | o | o | o |  | o | o | o |  | o | o | o | o | o | o | o | o |
| 24a | .106 | .084 |  | o | o | o | o | o | o | o |  | o | o | o | o | o | o | o | o |
| 25a | 0 | .106 | o | o | o | o | o | o | o | o |  |  |  |  |  |  |  |  |  |

Inventors:
Charles G. Moon,
Ira W. Lichtenfels,
by  [signature]
Their Attorney.

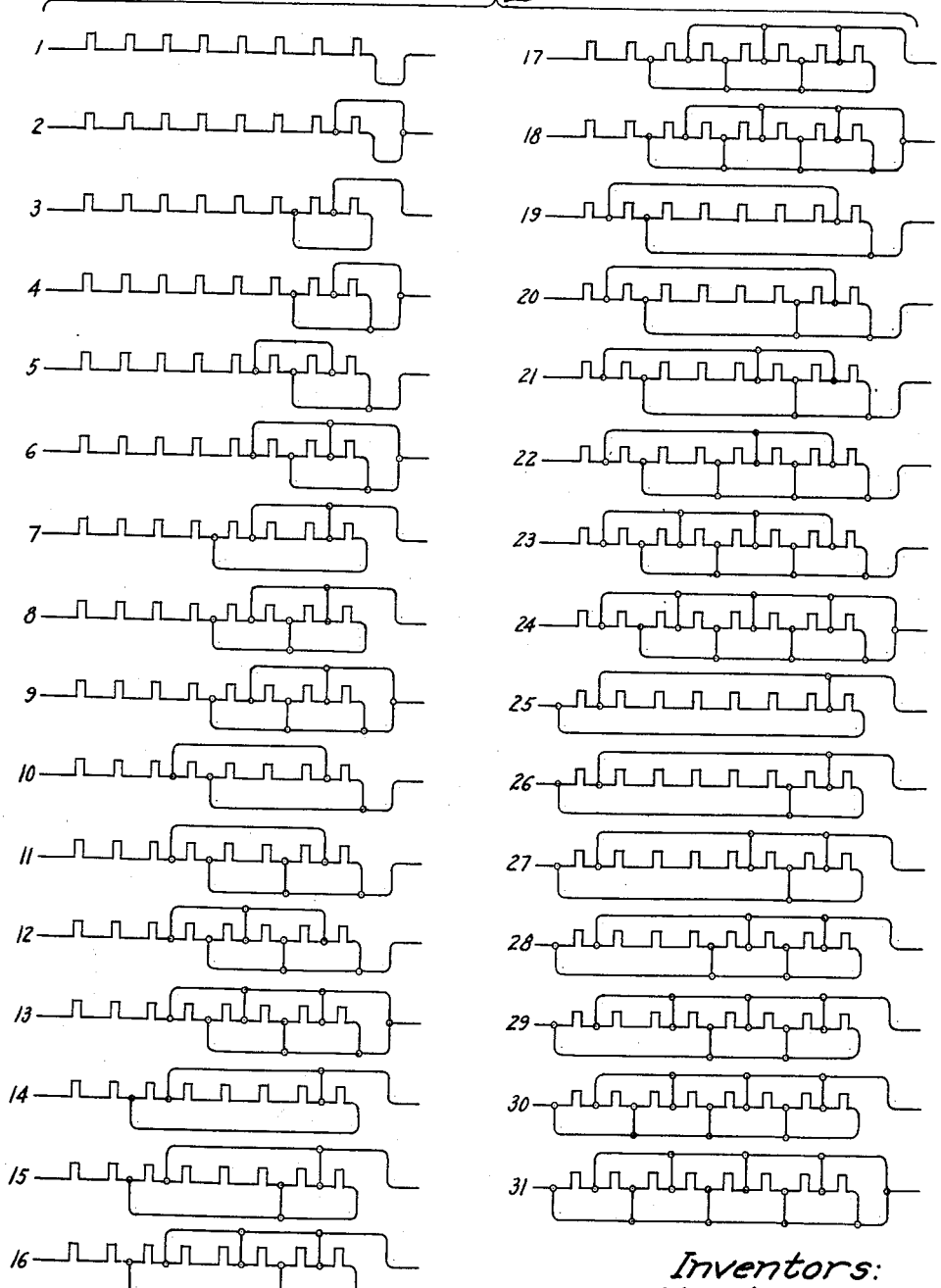

United States Patent Office 3,068,390
Patented Dec. 11, 1962

3,068,390
RESISTANCE SWITCHING NETWORK AND MOTOR CONTROL SYSTEM
Ira W. Lichtenfels and Charles G. Moon, Erie, Pa., assignors to General Electric Company, a corporation of New York
Continuation of abandoned application Ser. No. 469,184, Nov. 16, 1954. This application June 24, 1958, Ser. No. 744,892
7 Claims. (Cl. 318—270)

This invention relates to control resistors for electric motors having series, series and shunt, or shunt field windings of the kind in which, during acceleration and dynamic braking, the resistance is progressively cut out of the motor circuit to control the current there-through and, more particularly, for resistance shunting of motor field windings of traction motors.

This application is a continuation of the original application, Serial Number 469,184, filed November 16, 1945, by Ira W. Lichtenfels and Charles G. Moon, now abandoned, and assigned to the assignee of this invention.

It is well known that a D.C. type dynamoelectric machine produces very little voltage or E.M.F. when it is rotating well below its rated speed. Therefore, when this dynamoelectric machine is used as a motor, a variable controlled impedance in series with this varying motor impedance is necessary to regulate the total impedance of the circuit and prevent excessive currents during acceleration under load. Similarly, during dynamic braking a variable regulated impedance is required to control the current.

In the art relating to the control of electric motors, requiring resistance switching systems, particularly but not exclusively traction motors, there has been a continual effort to provide a maximum number of effective resistance reduction steps with a minimum of resistor mass, resistor sections, and number of associated switching devices. Such systems comprise a plurality of resistor sections and corresponding switches such as manual, electro-pneumatic, electromagnetic, or cam-operated contactors, whereby sections of a resistance may be shunted in turn or placed in various connections of series of parallel with other sections to reduce the series impedance of the system for accelerating during the motoring operation or decelerating during the dynamic braking operation.

It is desirable to remove the resistance in a large number of steps or "notches," since, with the motor operating at a specific torque in any one notch, movement of the controller to the next notch will cause an increase in motor torque, and in order to obtain a maximum overall usable acceleration without wheel slippage or excessive currents, the torque should be maintained as closely as practicable to a constant value. Consequently, it is desirable that the voltage increment or the resistance decrease shall be as small as practicable. On the other hand, the number of steps or notches available will generally be limited by the number of resistor sections, contractors, or mass of resistance which can be accommodated considering space and the complexity and cost of the control gear.

If it were practicable to use all of the resistor sections all of the time in either series or parallel connection, this would greatly reduce the resistor mass necessary for a particular application. However, theoretical attempts to do this in the past have resulted in such an increase in the number of switching contacts necessary that the mass of the switching mechanism becomes so great as to render the system impractical and unusable.

If it were practicable to use each of the switches for every notch, this would greatly reduce the number of switches necessary for a particular application. However, theoretical attempts to do this in the past have resulted in such an increase in the number and mass of resistor sections necessary the system is impractical and unusuable.

Every variable resistance system is use is an attempt to attain the ultimate in these two ideals; minimum resistor mass and taps, and minimum number of switching devices.

Therefore, an object of this invention is to provide a multistep electrical resistance switching network having an increased number of resistance steps for the number of contactors used, or for the same number of resistance steps to reduce the number of contactors used.

A further object is to provide an electrical resistance switching network which utilizes each portion of the resistor a greater percentage of the time.

A still further object is to provide an electrical resistance switching network which lends itself to simplified analysis.

Another object is to provide an electrical resistance switching network in which the resistance values of the steps are in geometric progression.

Another object is to provide an electrical resistance switching network in which switches close but do not open current carrying circuits, thus reducing contact wear and eliminating arc blow out attachments.

Another object is to provide an electrical resistance switching network which can conveniently be set up and is practical for any number of resistance steps due to the symmetry of the circuit arrangement.

Another object is to provide a motor control system using this improved resistance switching network.

Further objects and advantages of this invention will become apparent and this invention will be better understood from the following description, referring to the accompanying drawings. The features of novelty which characterize this invention will be pointed out with particularity in the claims annexed to and forming part of this invention.

Briefly, in accordance with our invention, one form contemplates the use of a resistor comprising a number of serially-connected resistance sections with alternate lateral voltage taps passing through contactors to two bus wires which may be alternately or consecutively connected in a load circuit to place sections of the resistor serially in the load circuit. The invention is particularly but not exclusively associated with a switching means commonly referred to as a drum controller, which may be operated automatically as disclosed in Letters Patent 2,566,898, issued to I. W. Lichtenfels and H. G. Moore on September 4, 1951, and assigned to the same assignee as this invention.

In operation, after the current in the resistor has reached a predetermined minimum, a section of the resistor is shunted. When the current again has decreased sufficiently, the shunted section is connected between the two bus wires in parallel with another section. This process is continued until all of the parallel sections are again shunted, at which time the shunted sections are selectively placed in parallel with the next consecutive section of the resistance.

In order that the invention may be clearly understood, reference now will be made by way of example to the accompanying drawings in which:

FIG. 1 is a schematic diagram illustrating one embodiment of the invention as applied to electric traction motors.

FIG. 2 is a sequence chart showing two possible predetermined sequences of operation of the controller, the total resistance of the resistor portion of the circuit and the resistance reduction between notches for a particular set of values of resistance sections, the contactors that are closed by the controller, and the resistor sections that are utilized during each notch.

FIG. 3 shows diagrams of the resistance circuit showing the predetermined arrangement of the main resistance sections in various notches of symmetric resistance shunting.

Referring to FIG. 1, the equipment shown illustrates contactors 1, 2, 3, 4, 5, 6, 7, 8 and 9 for connecting a current limiting load resistor having serially connected resistance sections A, B, C, D, E, F, G and H with voltage taps 11, 12, 13, 14, 15, 16, 17 and 18 therebetween. This resistor is serially connectable with the variable impedance load shown as the electrical traction motors 19 and 20, and the series motor field windings 21 and 22 through the contactor 1 and the bus wire 23. The contactor 2 connects the bus wire 24 and voltage tap 11 to the motors 19 and 20. Contactors 1 and 2 are operable to connect the bus wires 23 and 24 to point P. The contactors 3, 5, 7 and 9 each have one terminal connected to bus 23 and the other terminal connected to voltage taps 12, 14, 16 and 18 respectively. Similarly, contactors 4, 6 and 8 connect the bus wire 24 to the voltage taps 13, 15 and 17 respectively. All of the contactors may be operated by a single cam or drum controller 25. In the preferred arrangement the bus wires 23 and 24 are adapted to be connected to separate alternate voltage taps in predetermined arrangements as shown in FIG. 2 which illustrates the cam development of the controller 25.

In order that the motors 19 and 20 may be reversible, their respective field windings 21 and 22 are connected by the reversing switch shown schematically at 26.

When accelerating the series D.C. traction motors 19 and 20, the power is received by the pantograph 27 and passes through the starting or overcurrent switch 28 to the motors 19 and 20 and the series field windings 21 and 22. The current then passes through a portion of the resistor ABCDEFGH with one of the contactors 1 or 2 closed connecting bus wire 23 or 24 respectively in the load circuit, and to ground through the contactor or switch 31. In order that the resistor ABCDEFGH may be placed in series with the traction motors 19 and 20 across the power line for initial acceleration, or may be connected across the motors 19 and 20 for dynamic braking, or may be connected in parallel with the field windings 21 and 22 to further weaken the field produced by the field windings to further accelerate the traction motors, the contactor 31 is shown schematically as triple-throw switch which may, of course, be operated by any well known means such as cams of the controller 25, manually, relays, etc.

Assuming switches 28 and 31 are closed to ground the system through the motors and the engineman is ready to accelerate the traction motors 19 and 20 from standstill, the accelerating drum controller having the contact sequence shown in FIG. 2 is moved to notch 1, which, as shown by FIG. 2, closes contactor 1 to serially connect the bus wire 23 and connect the entire series resistor ABCDEFGH in the circuit (see FIG. 3, notch 1) between the varying impedance load of the motors 19 and 20 and the ground return of the system. As the motors 19 and 20 accelerate, they develop a back-voltage which reduces the current through series circuit including the resistor ABCDEFGH. At some predetermined minimum current, the drum controller is moved to notch 2, connecting bus wire 24 to the motor circuit and increasing the current of the series circuit by shunting the resistance section A. This increase of current increases the torque of the motors 19 and 20 to further accelerate the traction equipment.

Of course the controller 25 may be automatically moved from one notch to the next to close and open the contactors, but this is not a portion of this invention and will not be explained further. One control system showing automatic control of a motor operated cam controller is fully explained in the aforementioned Letters Patent 2,566,898.

For the purpose of explanation, we have assigned a set of specific values to the resistance sections A, B, C, D, E, F, G and H. For instance, the resistors sections A, B, C, D, E, F, G and H may have the resistance of 2.05, 2.05, 1.15, 1.15, .68, .68, .55 and .51 ohms respectively.

Thus, when resistance section A is shunted by moving from notch 1 to notch 2, the total resistance of 8.82 ohms is reduced to 6.77 ohms. It will be noted in FIG. 3 that closing contactor 2 in notch 2 connects the base wire 24 to shunt contactor 1 and eliminate current therethrough. From notch 2 to notch 3, the contactor 1 is opened without arcing damage because of this lack of current therethrough, and contactor 3 is then closed placing resistance sections A and B in parallel between the bus wires 23 and 24. The parallel resistance sections A and B are serially connected to series sections C, D, E, F, G and H as shown in notch 3 of FIG. 3. In moving to notch 4, contactor 1 is closed and bus wire 23 shunts resistance sections A and B through the closed contactors 1 and 3 and eliminates the current through contactor 2. On proceeding to notch 5, contactor 2 is opened and contactor 4 is closed to place sections A, B and C in parallel between bus wires 23 and 24. These parallel sections A, B and C are serially connected to series resistance sections D, E, F, G and H through contactor 4 and voltage tap 13. Proceeding to notch 6 closes contactor 2 to shunt sections A, B and C through bus wire 24 and contactor 4 to eliminate the current through the bus wire 23 and the contactors 1 and 3 to allow these contactors to be opened without arcing.

Proceeding to notch 7 closes contactor 5 to connect bus wire 23 to voltage tap 14 and to place resistance sections A and D in parallel between bus wires 23 and 24. In this notch the resistance sections B and C remain shunted by bus wire 24 which is connected at the voltage tap 11 and through the contactor 4 to the voltage tap 13. The parallel combination of resistance sections A and D is connected in series with resistance sections E, F, G and H through the contactor 5 which is connected to the voltage tap 14. Proceeding to notch 8 closes contactor 3 and places each of the resistance sections A, B, C and D in parallel between bus wires 23 and 24 with the parallel combination connected in series with series sections E, F, G and H through contactor 5. Proceeding to notch 9 closes the contactor 1 to shunt resistance sections A, B, C, D and contactors 2, 3 and 4 through bus wire 23 and the contactor 5, so that the contactors 2, 3 and 4 may be opened without the problem of arcing.

In the predetermined "symmetric" sequence shown in FIG. 2, notches 1 through 30, it should be noted that no contactor is opened unless both bus wires 23 and 24 are connected through contactors 1 and 2 respectively, so that the opening contactors are shunted to prevent arcing damage to the contactors.

The symmetric sequence shown in notches 1 through 30 of FIGURES 2 and 3 places resistance section A in the circuit 77% of the time. The resistance sections B, C, D, E, F, G and H are in the circuit 70, 67, 67, 70, 67, 87 and 100% of the time, respectively. This utilization of the various resistance sections for such a large percentage of the time uses much less resistor mass than a larger number of sections for a smaller percentage of the time. Thus, we are able to considerably reduce the bulk of the resistor, and also reduce the number of resistance sections, while still getting the necessary number of steps for the particular application.

This system of resistance shunting results in 30 resistance notches with eight sections of resistor shown in FIGURES 1 and 3. If a greater number of notches is required for a particular application, this system will result in 38 notches with 9 sections, 47 notches with 10 sections, 57 notches with 11 sections, 68 notches with 12 sections, etc. This is possible, following a predetermined symmetric type progression, even with the limitation of never opening a contactor that is carrying current, i.e., first placing resistor A in parallel with the last section to be connected, then placing A and B in parallel, then A, B and C, etc.

The resistance shunting system shown in FIG. 2 as notches 11a through 25a is still subject to the limitation of never opening a current carrying contactor. However, notches 11, 16, 19, 21 and 26 have been omitted to shorten the sequence and make the steps used more nearly geometric.

Other combinations of the resistance sections are of course possible by, for instance, closing contactors in the combination 1, 6, 7, 8 which would give an impedance of .79 ohm, or 2, 7, 8, 9 which would give an impedance of .264 ohm. However, when advancing from these "non-symmetric" notches in a predetermined arrangement to the next lower resistance position, it becomes more and more difficult to arrange the contactors in a progression where each contactor is opened after a notch where it has been shunted.

Of course the basic circuit as shown in FIG. 1 can be used with switches having provision for opening a current carrying contactor. The addition of arc arresters, increase of the air gap of the contactors, etc. may increase the current capacity of the contactors. Additional combinations are feasible, and for some applications of the circuit such switching sequences may be desirable. However, this increase of possible steps may be made uneconomical by the necessity of arc arrestors, increase in contactor air gap, etc. In heavy current applications this practice is likely to necessitate increased maintenance costs.

In summary, the double bus wires 23 and 24 in this resistance switching network provide for a convenient means of reaching a "corner point" or point from which parallel connections may be made as soon as one section of the resistor has been shunted. Thus, when resistance sections are shunted, these resistance sections may be placed in parallel with a resistance section of the unshunted resistor to partially shunt it and reduce the total resistance geometrically, as from notch 2 to notch 3, or notch 4 to notch 5, etc. In this network, at any time contactors 1 and 2 are closed, as in notch 2, 4, 6, 9, 13, 18, 24 or 31, all of the shunted contactors between the contactor last closed and the power line may be opened without the danger of arcing because of the shunting arrangement provided. With this predetermined switching arrangement, using the symmetrical approach as shown in notches 1 through 31, it is simple matter to calculate the impedance of the resistance shunting system. It is apparent that this arrangement uses fewer contactors to provide more steps than previous systems, because of the fact that corner points are utilized more quickly than in previous systems. Also, it is readily apparent that every section of the resistor element is used a larger percentage of the time than was practicable in past resistance shunting schemes.

While we have shown and described a particular embodiment of this invention, further modifications and improvements will occur to those skilled in the art. We desire it understood, therefore, that this invention is not limited to the forms shown and we intend by the appended claims to cover all modifications which do not depart from the true spirit and scope of our invention.

What we claim as new and desire to secure by Letters Patent of the United States is:

1. In a controller circuit for a series electric motor, a plurality of serially connected resistance sections, a voltage tap between each of the sections, a bus wire connected to one end of the resistance sections, a second bus wire connected to the voltage tap next adjacent, contactors for selectively connecting the remaining voltage taps to the first and second bus wires alternately and for connecting the bus wires in circuit with the motor, and controller means for sequentially operating the contactors to connect the resistance sections initially in series by connecting the first bus wire in circuit with the motor and thereafter to shunt one section by connecting the second wire to the motor circuit at the same point of connection as the first bus wire, to connect the shunted section in parallel with a remaining section by disconnecting the first bus wire from the point and connecting the first bus wire to one of the voltage taps, to shunt the parallel sections by connecting the first bus wire to the same point, and then selectively to connect the shunted sections in parallel with a remaining section by disconnecting the second bus wire from the motor and selectively connecting the second bus wire to one of the voltage taps, this operation being repeated until substantially all of the sections are connected in parallel with one another in the motor circuit.

2. In a controller circuit for a direct current electric motor provided with a series field winding, a resistance switching network comprising a plurality of serially connected resistance sections, a voltage tap between each of the resistance sections, a bus wire connected to one end of the resistance sections, a second bus wire connected to a first voltage tap next adjacent to the one end, contactors for selectively connecting the remaining voltage taps alternately to the first and the second bus wires and for connecting the bus wires in circuit with the motor, a cam operated controller operatively connected to the contactors for regulating the impedance of the network by sequentially operating the contactors to connect the resistance sections initially in series by connecting the first bus wire in circuit with the motor and thereafter to shunt one section by connecting the second wire to the motor circuit at the same connection point as the first bus wire, to connect the shunted section in parallel with the adjacent sections remaining by disconnecting the first bus wire from the point and connecting the first bus wire to a second voltage tap adjacent to the first tap, to shunt the parallel sections by connecting the first bus wire to the same connection point as the second bus wire, and then selectively to connect the shunted sections in parallel with a remaining section by disconnecting the second bus wire from the point and selectively connecting the second bus wire to a third voltage tap adjacent to the second voltage tap, this operation being repeated until substantially all of the sections are connected in parallel with one another in the motor circuit, and other contactors for selectively connecting the resistor sections in circuit with the motor for dynamic braking or further field weakening.

3. A resistance switching network for controlling the value of current in an electric circuit comprising, a plurality of serially connected resistance segments having taps therebetween, first and second bus wires connectable at one end to a common point in the electric circuit, said first bus wire being directly connected to one end of said segments, said one end being connectable through first switching means to said common point, said second bus wire being directly connected to the tap next adjacent said one end, second switching means for connecting said tap next adjacent to said common point, the remainder of said taps being alternately connected through other switching means to said first and second bus wires, means for connecting the second end of said serially arranged segments to complete the electric circuit, and controller means to selectively operate said first and second switching means and said other switching means to progressively vary the effective resistance of the network.

4. A resistance switching network for controlling the value of current in an electric circuit comprising, a plurality of serially connected resistance segments having taps therebetween, first and second bus wires connectable at one end to a common point in the electric circuit, said first bus wire being directly connected to one end of said segments, said one end being connectable through first switching means to said common point, said second bus wire being directly connected to the tap next adjacent said one end, second switching means for connecting said tap next adjacent to said common point, the remainder of said taps being alternately connected through other switching means to said first and second bus wires, means for connecting the second end of said serially arranged segments to complete the electric circuit, and controller means to selectively operate said first and second switching means and said other switching means to progressively vary the effective resistance of the network, said other switching means made operable to interrupt current flow only when both said first and said second switching means are closed.

5. A resistance switching network for controlling the value of current in an electric circuit which includes at least one direct current motor having a series field winding, comprising, a plurality of serially connected resistance segments having taps therebetween, first and second bus wires connectable at one end to a common point in the electric circuit, said first bus wire being directly connected to one end of said segments, said one end being connectable through first switching means to said common point, said second bus wire being directly connected to the tap next adjacent said one end, second switching means for connecting said tap next adjacent to said common point, the remainder of said taps being alternately connected through other switching means to said first and second bus wires, means for connecting the second end of said serially arranged segments to complete the electric circuit, all of said other switching means being directly connected through said bus wires to said first or said second switching means, and means to selectively operate all of said switching means to progressively vary the effective resistance of the network in a predetermined manner.

6. A resistance switching network for controlling the value of current in an electric circuit which includes at least one direct current motor having a series field winding, comprising, a plurality of serially connected resistance segments having taps therebetween, first and second bus wires connectable at one end to a common point in the electric circuit, said first bus wire being directly connected to one end of said segments, said one end being connectable through first switching means to said common point, said second bus wire being directly connected to the tap next adjacent to said one end, second switching means for connecting said tap next adjacent to said common point, the remainder of said taps being alternately connected through other switching means to said first and second bus wires, means for connecting the second end of said serially arranged segments to complete the electric circuit, all of said other switching means being directly connected through said bus wires to said first or said second switching means, and means to selectively operate all of said switching means to progressively vary the effective resistance of the network in a predetermined manner, said other switching means made operable to interrupt current flow only when both said first and said second switching means are closed.

7. A resistance switching network for controlling the value of current in an electric circuit comprising, a plurality of serially connected resistance segments having taps therebetween, first and second bus wires connectable at one end to a common point in the electric circuit, said first bus wire being directly connected to one end of said segments, said one end being connectable through first switching means to said common point, said second bus wire being directly connected to the tap next adjacent said one end, second switching means for connecting said tap next adjacent to said common point, the remainder of said taps being alternately connected through other switching means to said first and second bus wires, means for connecting the second end of said serially arranged segments to complete the electric circuit, all of said other switching means being directly connected through said bus wires to said first or said second switching means, and means to selectively operate all of said switching means to vary the effective resistance of the network in a predetermined manner.

References Cited in the file of this patent

UNITED STATES PATENTS 2,131,588     Gray _____ Sept. 27, 1938